US006678694B1

(12) United States Patent
Zimmermann et al.

(10) Patent No.: US 6,678,694 B1
(45) Date of Patent: Jan. 13, 2004

(54) INDEXED, EXTENSIBLE, INTERACTIVE DOCUMENT RETRIEVAL SYSTEM

(75) Inventors: Michael Zimmermann, Hamburg (DE); Joerg Thielke, Hamburg (DE); Christoph Holz, Hamburg (DE)

(73) Assignee: Frank Meik, Homburg (DE)

( * ) Notice: Subject to any disclaimer, the term of this patent is extended or adjusted under 35 U.S.C. 154(b) by 419 days.

(21) Appl. No.: 09/708,821

(22) Filed: Nov. 8, 2000

(51) Int. Cl.[7] ............................................... G06F 17/30
(52) U.S. Cl. ....................................................... 707/102
(58) Field of Search ................................ 707/3, 4, 5, 6, 707/10, 102, 104.1; 709/203, 228; 717/113, 127

(56) References Cited

U.S. PATENT DOCUMENTS

| 5,418,948 A | * | 5/1995 | Turtle ............................. 707/4 |
| 5,924,090 A | | 7/1999 | Krellenstein |
| 5,987,460 A | * | 11/1999 | Niwa et al. ..................... 707/6 |
| 6,233,575 B1 | * | 5/2001 | Agrawal et al. ............... 707/6 |

FOREIGN PATENT DOCUMENTS

| EP | 0 687 987 A1 | 12/1995 |
| WO | WO 00/63837 | 10/2000 |

OTHER PUBLICATIONS

Moller et al.; "Automatic Classification of the World Wide Web Using Universal Decimal Classification," Online Information 99 Proceedings 23rd International Online Information meeting, Proceedings of Online Information 99, London, UK, Dec. 7–9, 1999; pp. 231–237.

Anonymous; "Taxonomized Web Search" IBM Technical Disclosure Bulletin, IBM Corp, New York; vol. 40, No. 5, May 1, 1997; pp. 195–196.

* cited by examiner

*Primary Examiner*—Diane D. Mizrahi
*Assistant Examiner*—Apu Mofiz

(57) ABSTRACT

An Internet or intranet based document retrieval system contains a database that relates document word-pair patterns to topics. In response to a word submitted by a requestor, the system retrieves documents containing that word, analyzes the documents to determine their word-pair patterns, matches the document patterns to database patterns that are related to topics, and thereby assigns topics to each document. If the retrieved documents are assigned to more than one topic, a list of the document topics is presented to the requestor, and the requestor designates the relevant topics. The requestor is then granted access only to documents assigned to relevant topics. A knowledge base linking search terms to documents and documents to topics is established and maintained to speed future searches.

64 Claims, 11 Drawing Sheets

INTERACTIVE RETRIEVAL SYSTEM

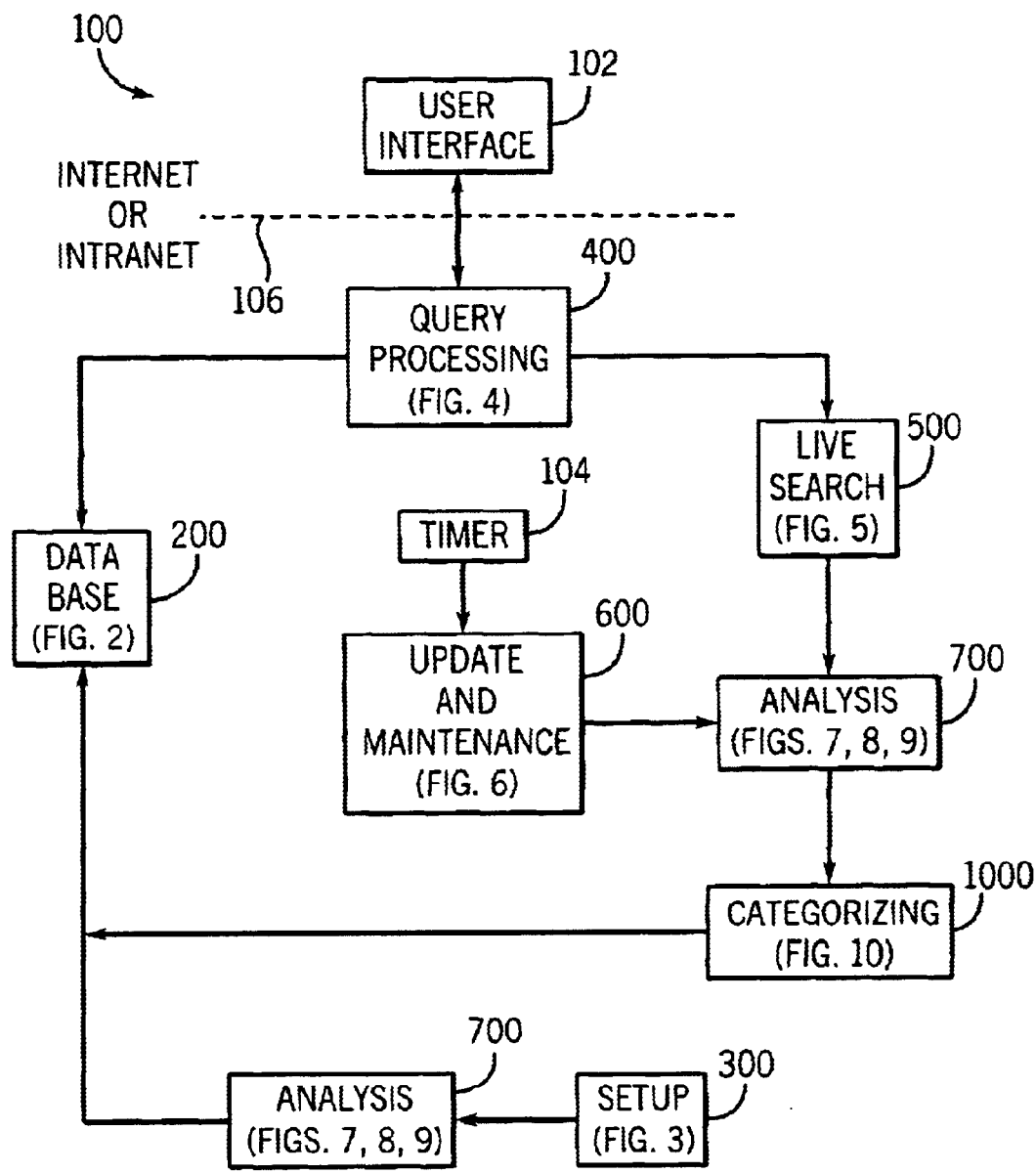
FIG. 1 – INTERACTIVE RETRIEVAL SYSTEM

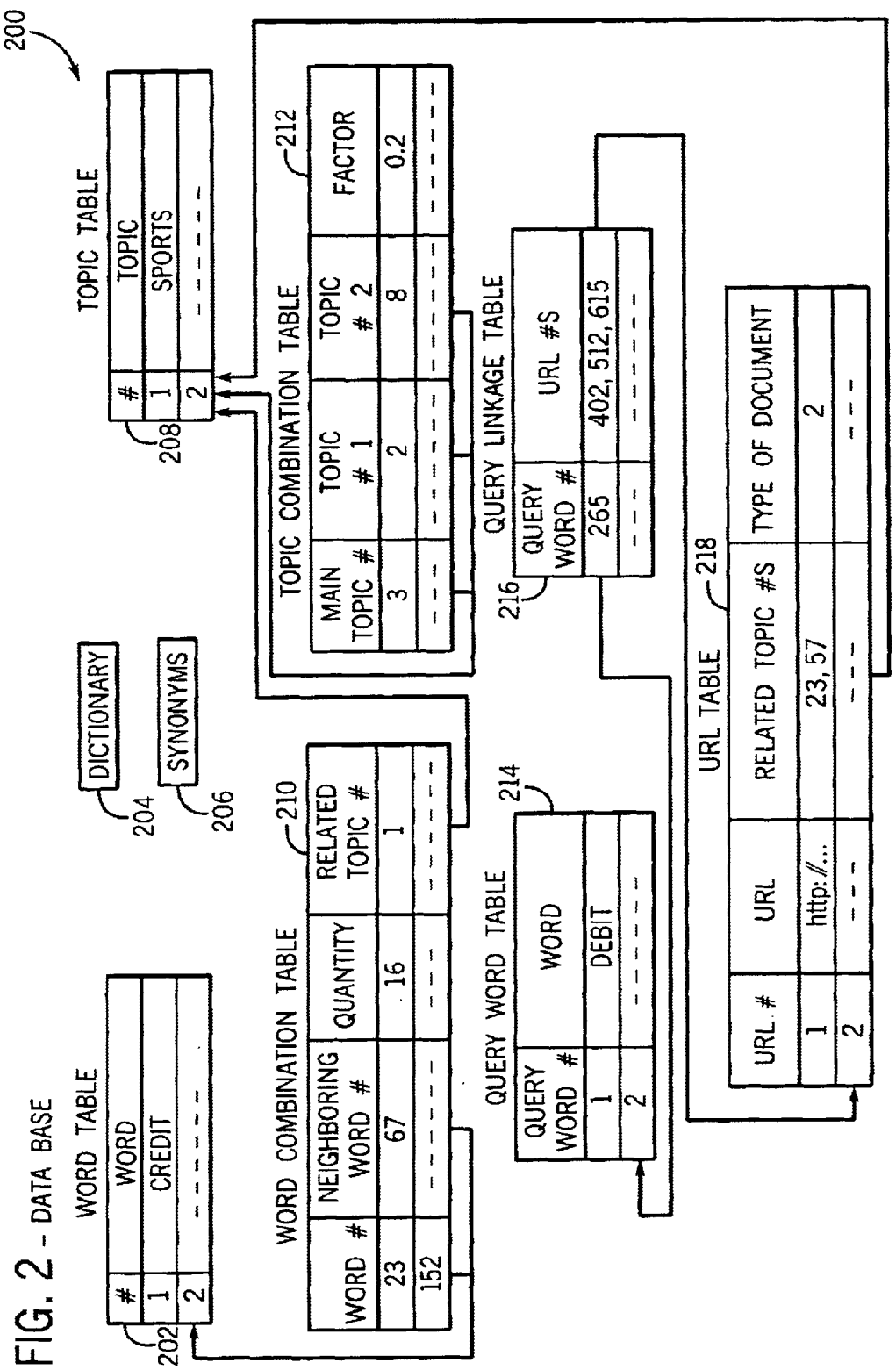
FIG. 2 – DATA BASE

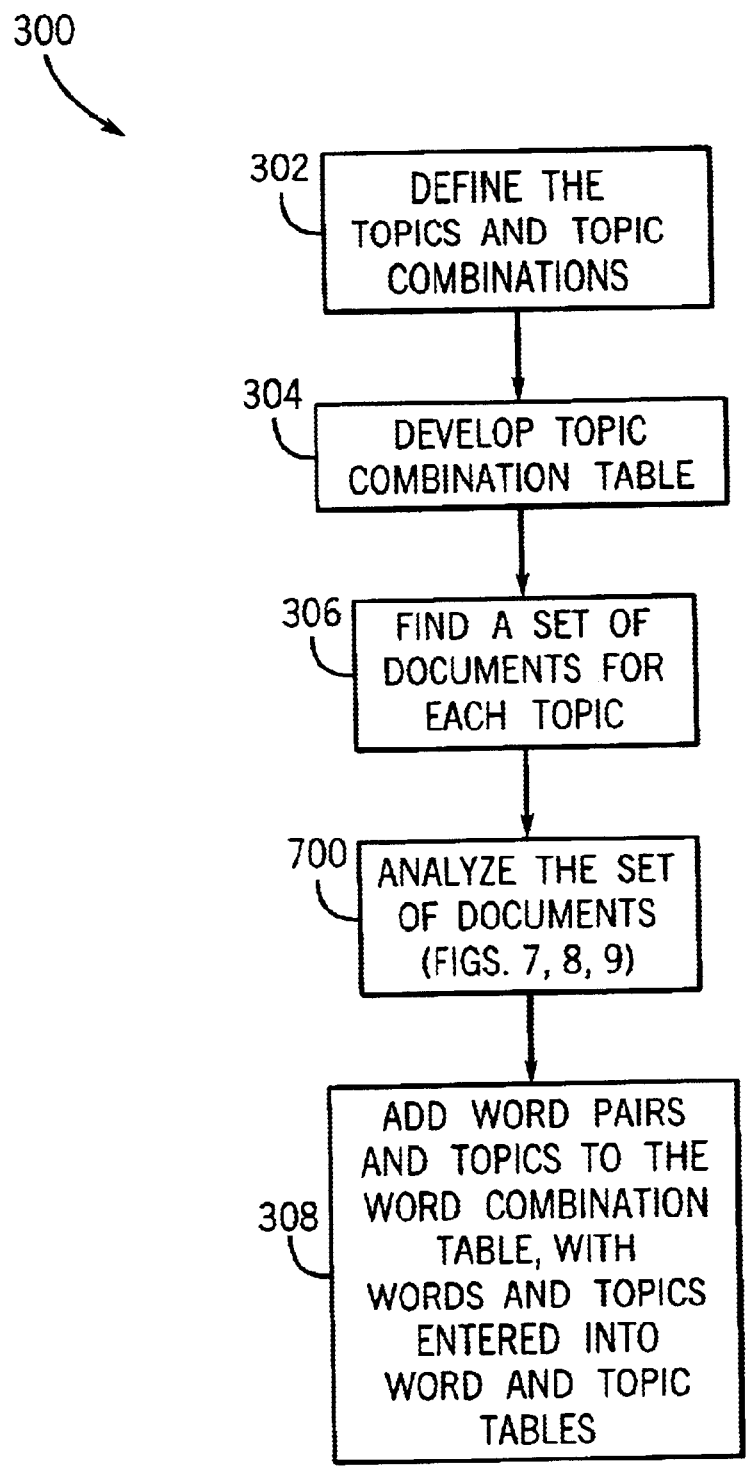
FIG. 3 – SETUP

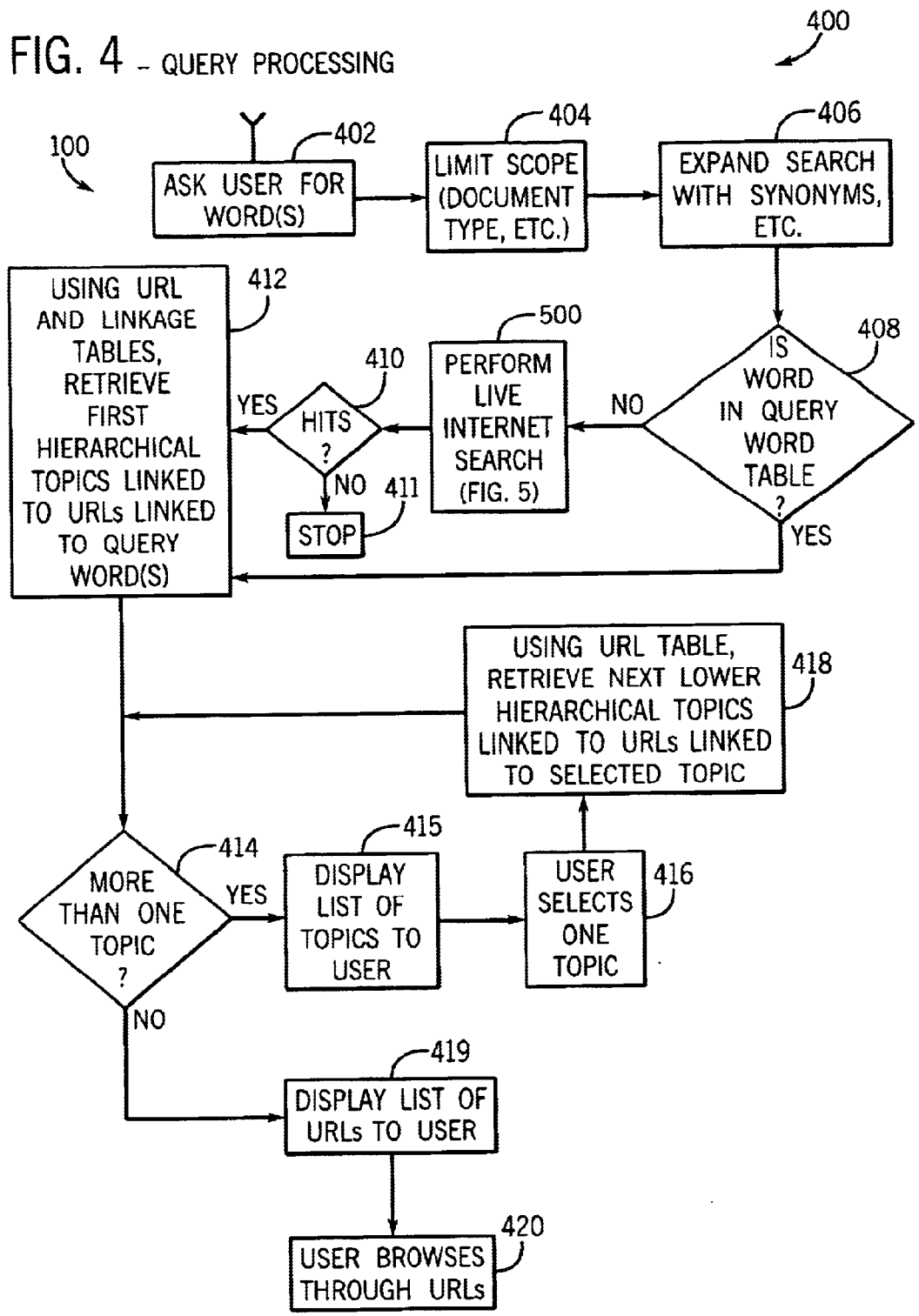

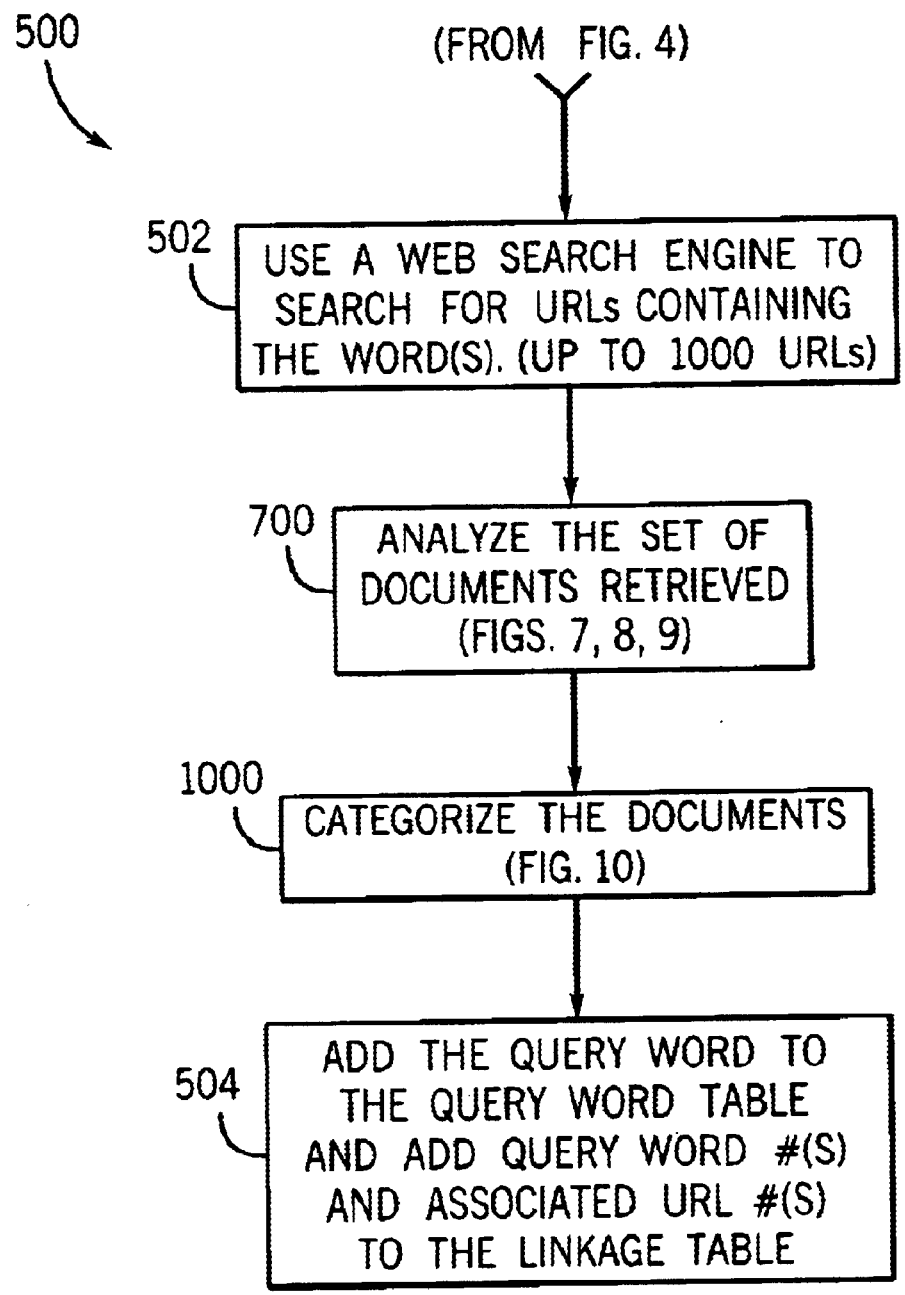
FIG. 5 – LIVE SEARCH

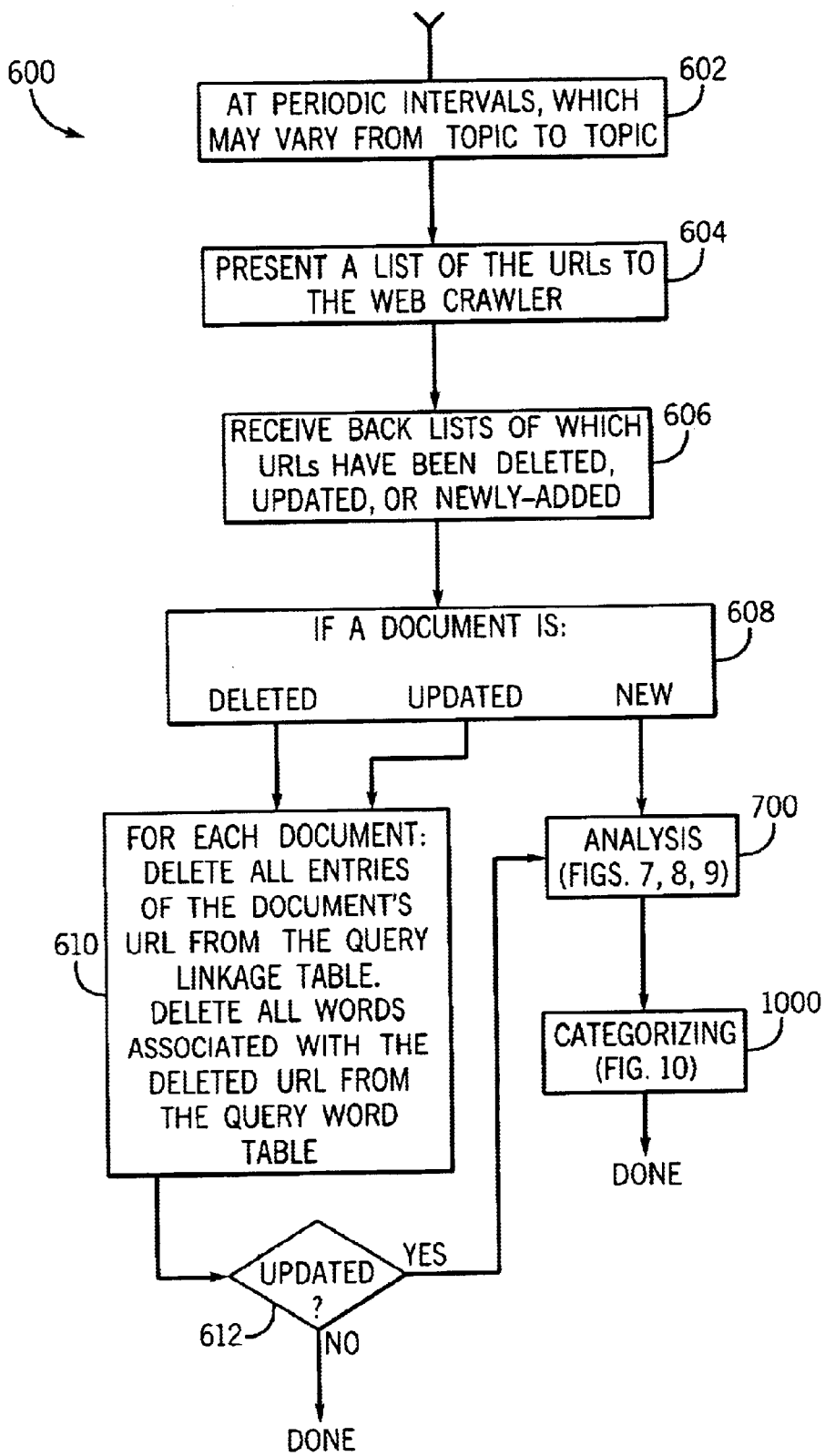
FIG. 6 — UPDATE AND MAINTENANCE

FIG. 7 – ANALYSIS
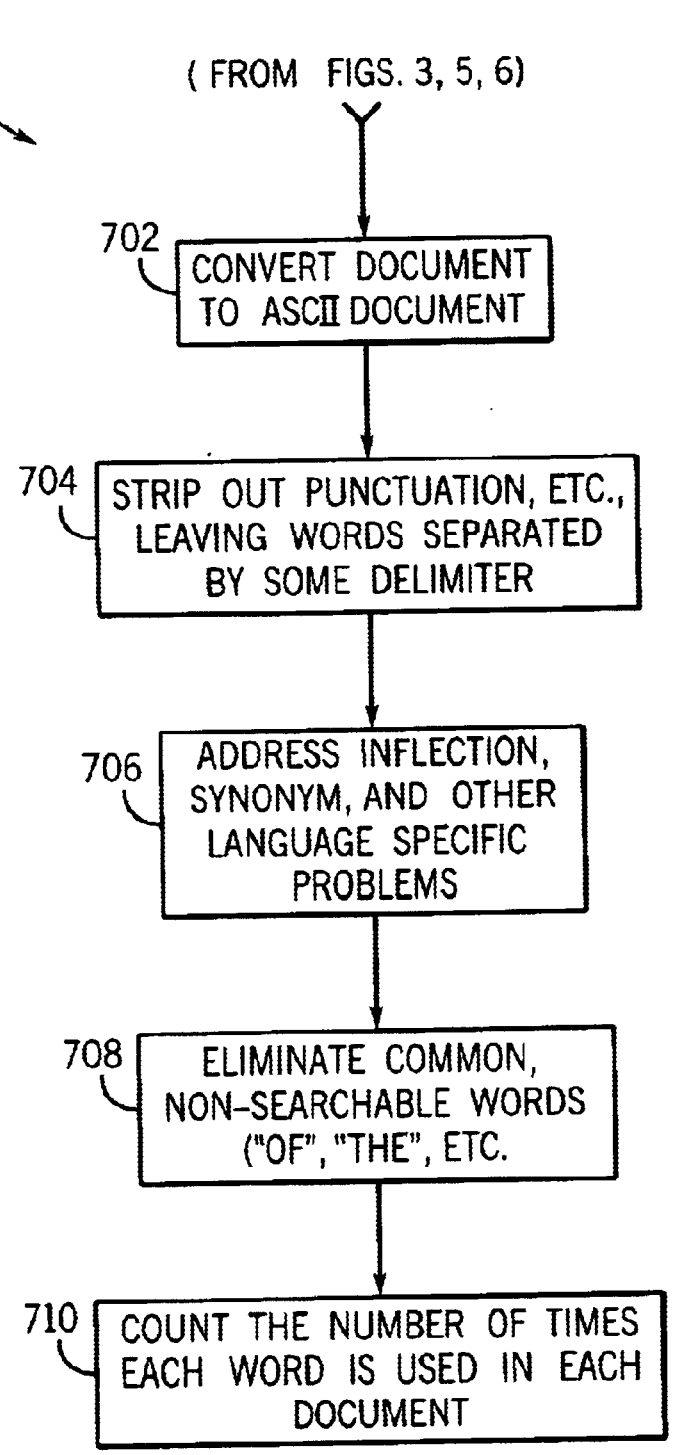

FIG. 8 ANALYSIS (CONT. - 1)
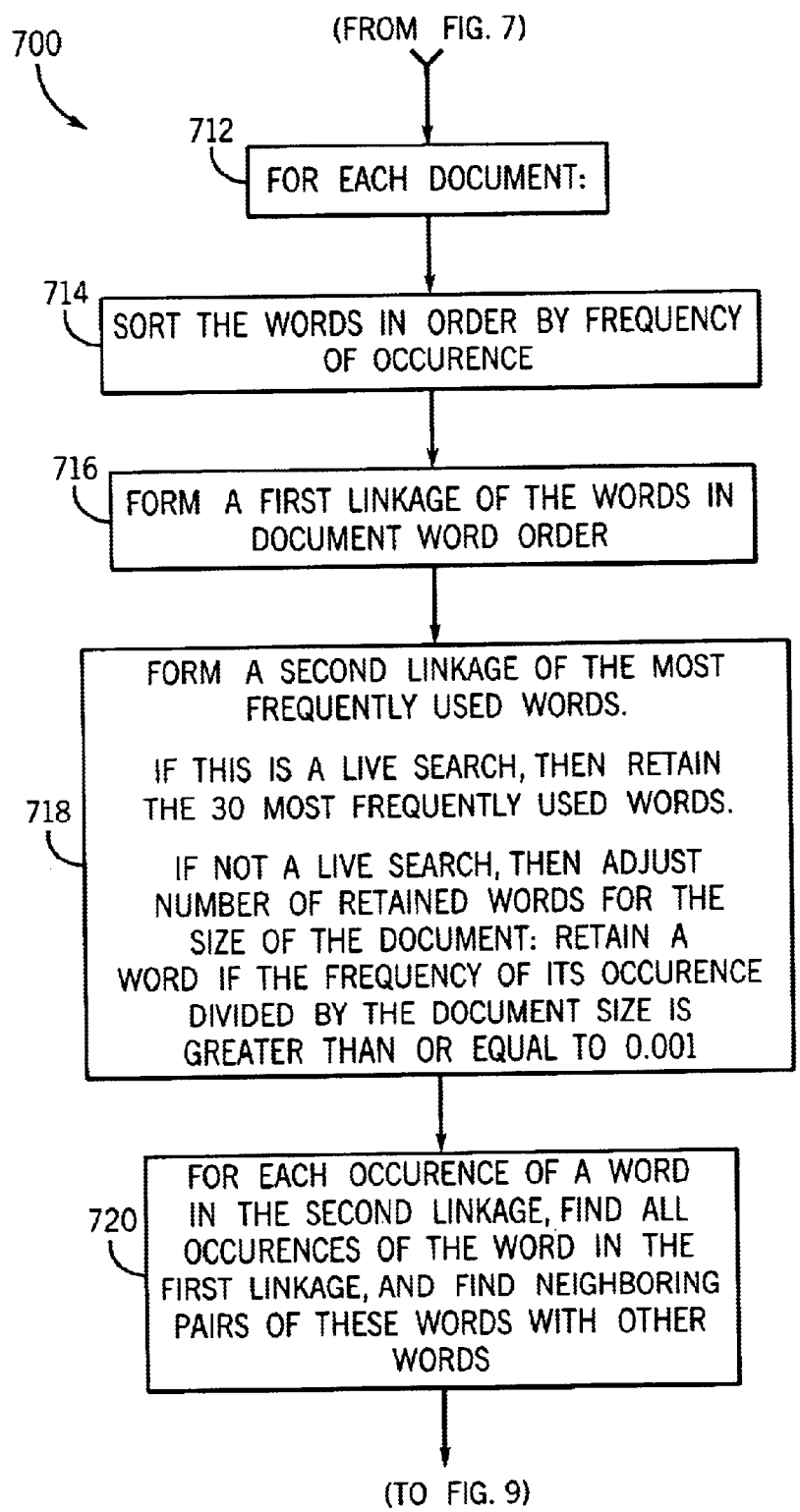

FIG. 9 – ANALYSIS (CONT. -2)
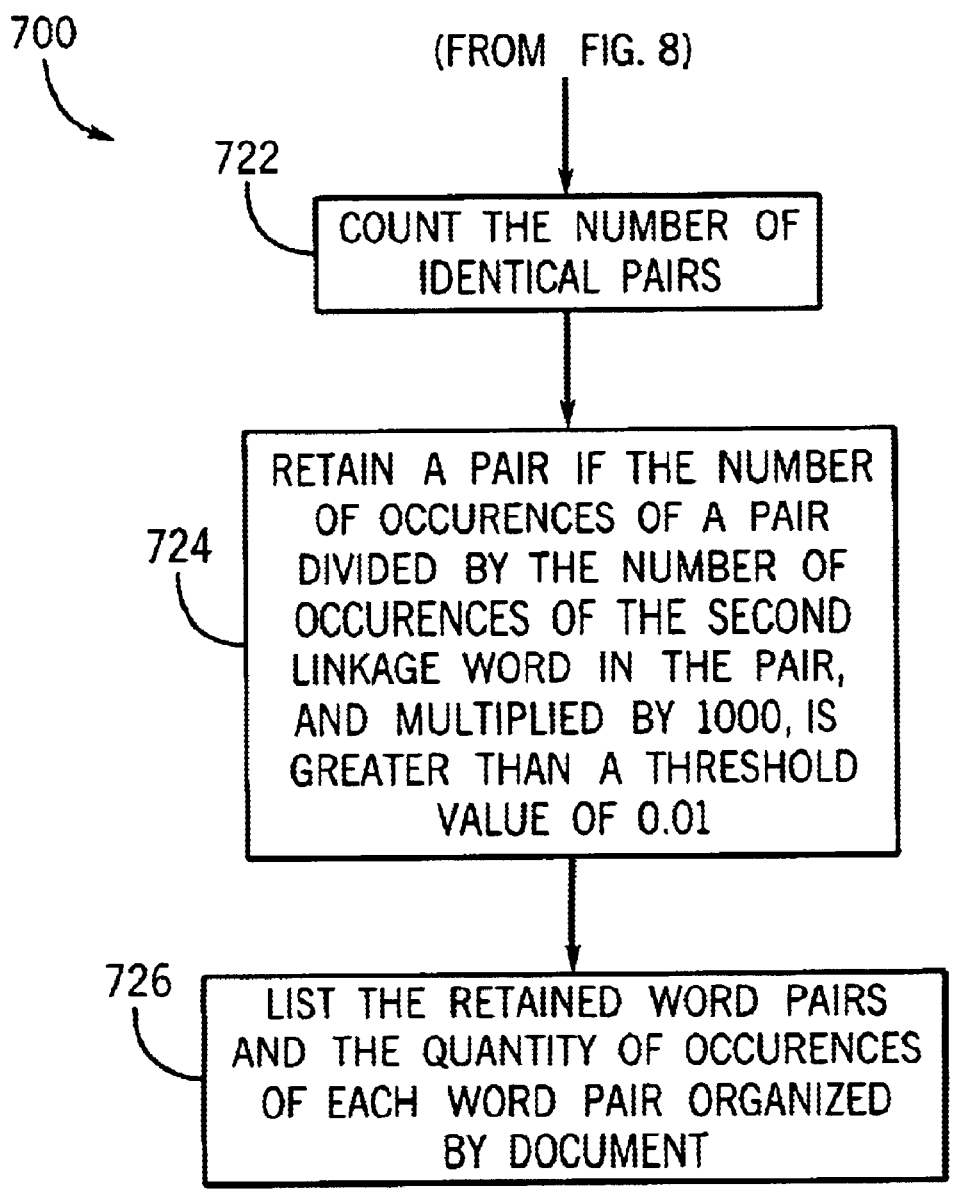

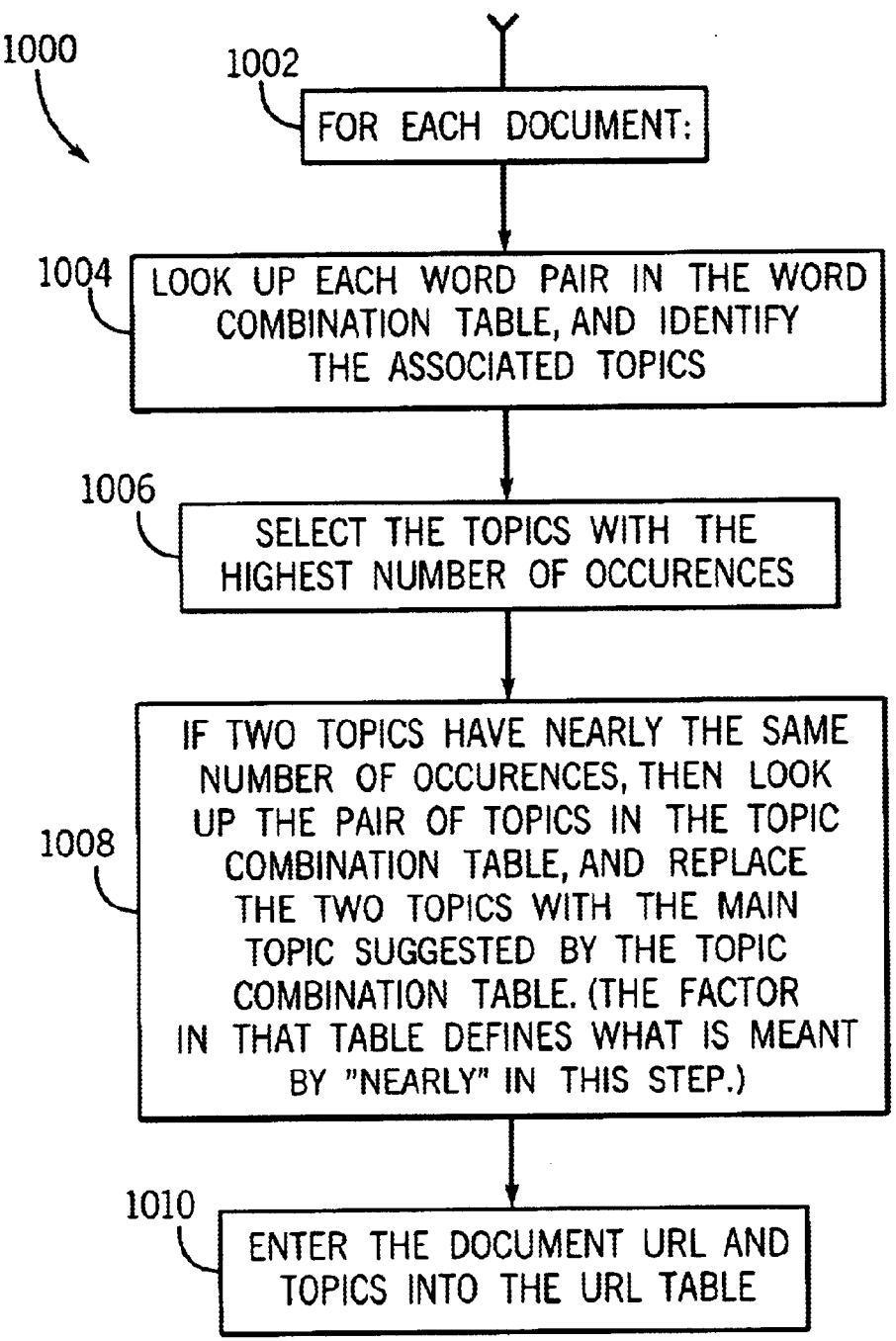
FIG. 10 – CATEGORIZING

FIG. 11 – HARDWARE
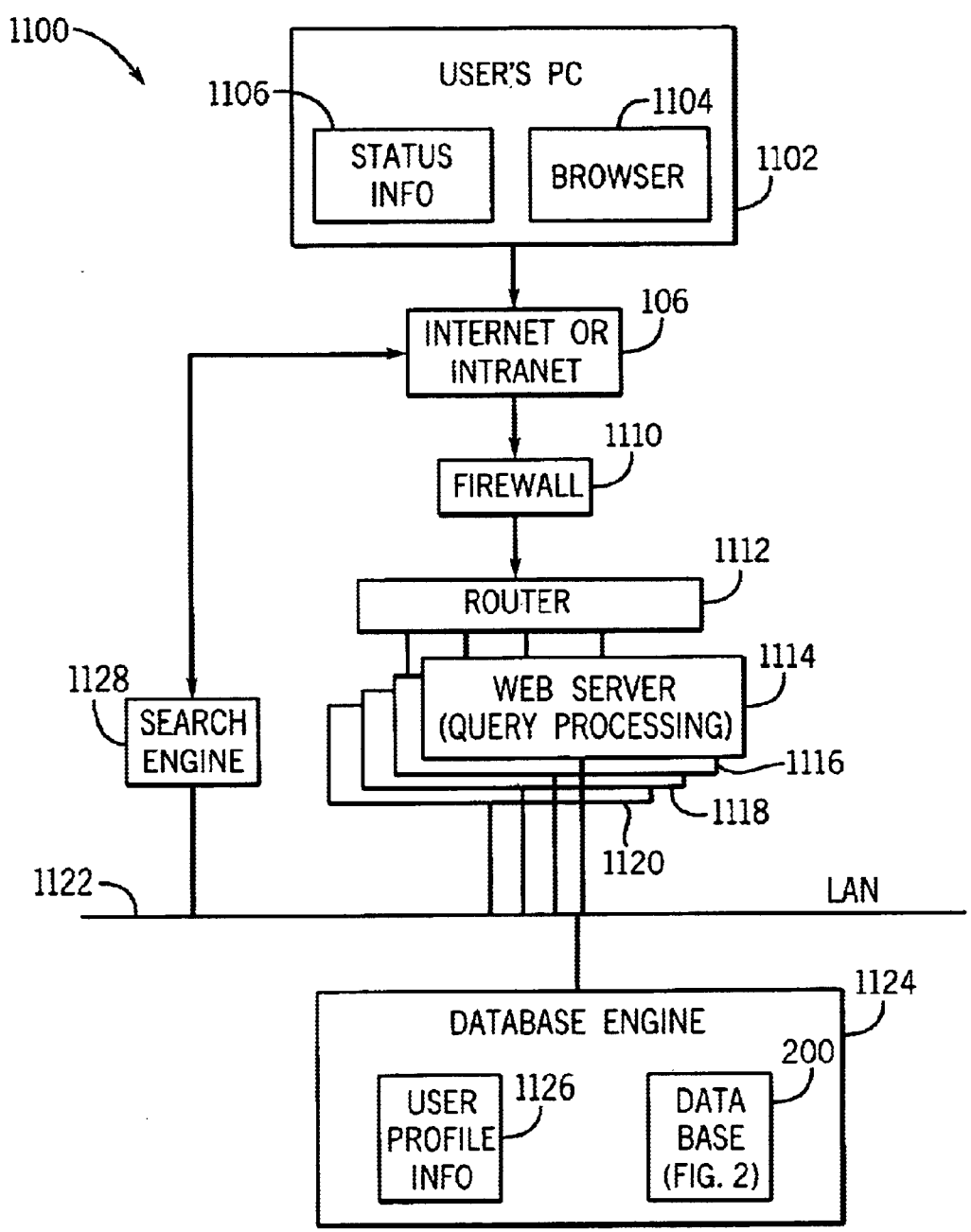

INDEXED, EXTENSIBLE, INTERACTIVE DOCUMENT RETRIEVAL SYSTEM

CROSS-REFERENCE TO RELATED APPLICATIONS

Not applicable.

STATEMENT RE FEDERALLY SPONSORED RESEARCH OR DEVELOPMENT

Not applicable.

FIELD OF THE INVENTION

The present invention relates to document retrieval systems, and more particularly, to search systems suitable for locating documents on an internet or intranet.

BACKGROUND OF THE INVENTION

The earliest retrieval systems were mainframe computers that contained the full text of thousands of documents and that were accessed from time sharing terminals. The earliest such systems, developed in the early 1960's, took a list of words and linearly searched through a tape library of the documents searching directly for those that contained the specified words. By the mid to late 1960's, more sophisticated systems first developed word indices or concordances of the searchable words in the set of documents (excluding nonsearchable words such as of, the, and). The concordance contained, for each word, the document numbers of all the documents that contained the word. In some systems, this document number was accompanied by the number of times the word appeared in the corresponding document to serve as a crude measure of the relevance of each word to each document. Such systems simply required the requestor to type in a list of words, and the system then computed and assigned a relevance to each document, retrieving and displaying the documents to the requestor in relevance order. An example of such a system was the QuicLaw system developed by Hugh Lawford at Queens University in Canada with support from IBM Canada. Phrase searches on that system were done by examining the documents and scanning them for phrases after they had been retrieved, and accordingly phrase searches were slow.

Other systems, such as Mead Data Central's LEXIS system developed by Jerome Rubin and Edward Gotsman and others, included in its concordance an entry for each and every word, which included, along with the document number (of the document that contained the word), a document segment number (identifying the segment of the document in which the word appeared) and also a word position number (identifying where, within the segment, the word appeared relative to other words). West Group's WESTLAW system, developed a few years later by William Voedisch and others, improved upon this by including in the concordance entry for each word a paragraph number (indicating where the word appeared within the segment), a sentence number (indicating where the word appeared within the paragraph), and a word position number (indicating where the word appeared within the sentence). These two systems, which are still in use today, both permit the logical connectors or operators, AND, OR, AND NOT, w/seg (within the same segment), w/p (within the same paragraph), w/s (within the same sentence), w/4 (within 4 words of each other), and pre/4 (preceding by 4 words) to be used to write out formal, complex search requests. Parenthesis permit one to control the order of execution of these logical operations. Another class of systems, and in particular the Dialog system which is still in use today, grew out of the early NASA RECON system that assigned names to previously-performed searches so that those searches could be incorporated by reference into later-performed searches.

Professional librarians and legal researchers use all three of these systems regularly. However, these professionals must train for many weeks and months to learn how to formulate complex queries containing parenthesis and logical operators. Lay searchers cannot use these powerful systems with the same degree of success because they are not trained in the proper use of operators and parenthesis and do not know how to formulate search queries.

These systems also have other undesirable properties. When asked to search for multiple words and phrases conjoined by OR, these systems tend to recall far too many unwanted documents—their precision is poor. Precision can be improved by the addition of AND operators and word proximity operators to a search request, but then relevant documents tend to be missed, and accordingly the recall rate of these systems suffers.

To enable untrained searchers to use these systems, various artificial intelligence schemes have been developed which, like the early QuicLaw system, simply permit a requestor to type in a list of words or a sentence, and then produce some ranking and production of the documents. These systems produce variable results and are not particularly reliable. Some ask the requestor to select a particularly relevant document, and then, using the words which that document contains, these systems attempt to find similar documents, again with rather mixed results.

The WESTLAW system also contains some formal indexing of its documents, with each document assigned to a topic and, within each topic, to a key number that corresponds to a position within an outline of the topic. But this indexing can only be used when each document has been hand-indexed by a skilled indexer. New documents added to the WESTLAW system must also be manually indexed. Other systems provide each document with a segment or field that contains words and/or phrases that help to identify and characterize the document, but again this indexing must be done manually, and the retrieval systems treat these words and phrases in the same manner as they do other words and phrases in the document.

With the development of the Internet, web crawlers have been developed that search the web creating what amount to concordances of thousands of web pages, indexing documents by their URLs (uniform resource locators or web addresses) as well as by the words and phrases that they contain and also by index terms optionally placed into a special field of each document by the document's authors. But these search engines retrieve thousands of documents containing a word or phrase and do not assist one in sorting through all the documents that are captured. In other words, their precision is poor. And the introduction of the AND operator to these systems causes their recall to suffer.

All of these systems suffer from an even more fundamental defect: They do not teach the requestor how to search other than to the extent that the requestor accidentally encounters new words and phrases while browsing. They also do not suggest, nor automate, the application and the use of indexing to the extent that indexing is available. They do not query the requestor, offering the requestor alternative ways to proceed. They do not automatically index new documents that have not previously been indexed manually.

Accordingly, it is a primary object of the present invention to provide a document retrieval system, suitable for searching for documents on the Internet or on an intranet, that is indexed, that is extensible without additional manual indexing, and that accepts broadly formulated queries from a requestor, and that then enters into a dialogue with the requestor to refine and focus the search, using precise indexing to improve considerably the precision of searching, minimizing browse time and false hits, without suffering a corresponding reduction in the relevant document recall rate.

BRIEF SUMMARY OF THE INVENTION

Briefly summarized, the present invention is an interactive document retrieval system that is designed to search for documents after receiving a search query from a requestor. It contains a knowledge database that contains at least one data structure which relates document word patterns to topics. This knowledge database can be derived from an indexed collection of documents.

The present invention utilizes a query processor that, in response to the receipt of a search query from a requestor, searches for and tries to capture documents containing at least one term that is related to the search query. If any documents are captured, the processor analyzes the captured documents to determine their word patterns, and it then categorizes the captured documents by comparing each document's word pattern to the word patterns in the database. When a document's word pattern is similar to a word pattern in the database, the processor assigns to that document the similar word pattern's related topic. In this manner, each document is assigned to one or several topics. Next, a list of the topics assigned to the categorized documents is presented to the requestor, and the requestor is asked to designate at least one topic from the list as a topic that is relevant to the requestor's search. Finally, the requestor is granted access to the subset of the captured and categorized documents to which topics designated by the requestor have been assigned.

The system may rely on a server connected to the Internet or to an intranet, and the requestor may access the system from a PC equipped with a web browser. To save time, queries once processed are saved along with the list of documents retrieved by those queries and the topics to which they are assigned. Periodic update and maintenance searches are performed to keep the system up-to-date, and analysis and categorization performed during update and maintenance is saved to speed the performance of searches later on.

The system may be set up initially and trained by having it analyze a set of documents that have been manually indexed, saving in a word combination table within the knowledge database a record of the word patterns of these documents and relating these word patterns to the topics assigned to each document. The word patterns may be adjacent pairs of searchable words (not including non-searchable words such as of, and, etc.) where one of the words in each such pairing occurs frequently within the document.

Further objects and advantages of the invention are apparent in the detailed description which follows. The features of novelty which characterize the invention are pointed out with particularity in the claims annexed to and forming a part of this specification.

BRIEF DESCRIPTION OF THE DRAWINGS

For a better understanding of the invention, reference will be made to the drawings, wherein:

FIG. 1 is an overview block diagram of an indexed, extensible, interactive retrieval system designed in accordance with the principals of the present invention;

FIG. 2 illustrates the data base that supports the operation of the retrieval system;

FIG. 3 is a flow diagram of the setup procedure for the retrieval system;

FIG. 4 is a flow diagram of the query processing procedure for the system;

FIG. 5 is a flow diagram of the live search procedure that is executed by the query processing procedure when a new query word is encountered;

FIG. 6 is a flow diagram of the update and maintenance procedure for the system;

FIGS. 7, 8, and 9 together form a flow diagram of the document analysis procedure;

FIG. 10 is a flow diagram of the document categorizing procedure; and

FIG. 11 presents an overview block diagram of the system hardware.

DETAILED DESCRIPTION OF THE PREFERRED EMBODIMENT

A fundamental concept underlying the present invention is having it function as if the requestor were talking to another human being, rather than to a machine. The requestor asks a question by entering a search term. The retrieval system then responds, as a human might, with a question of its own that prompts the requestor to select one from several suggested topics (or subjects or themes) to narrow and focus the search, improving search precision without a commensurate drop in recall. Through one or more such questions and answers, the requestor is enabled to narrow the scope of the search to a small, indexed subset of all the documents that contain the search term that the requestor provided.

The system thus tries to eliminate semantic ambiguities by narrowing down the search through dialogue and through the use of indexing of the documents. The indexing, being relatively precise, greatly improves precision by blocking the retrieval of documents that use the search term in semantically different ways than those intended by the requestor. But since only documents containing semantically different meanings of the search term are blocked from retrieval, the recall performance of the system remains relatively unimpaired.

As an example, if the requestor enters the search term golf into the system, the requestor will be presented with a list of topics that are related to the search term golf in differing ways (e.g. Cars, Sports, Geography, etc.). If the requestor chooses the topic Cars, he or she will then be presented with a list of subtopics (Buy and Sell Cars Technical Specifications, Car Repair, etc.) and must make another choice of a subtopic. Finally, the requestor is presented with a set of documents that are closely related to the selected topics as well as to the search term.

At the center of this approach is the concept of having every document analyzed and categorized, preferably ahead of time, into a hierarchical scheme of topics or index categories. The topics are incorporated into the system when it is first set up and again whenever a new document is found and categorized. This process of assigning documents to topics is called knowledge development. It must be done once manually as a system setup activity. Over time, search terms are saved along with the documents to which they are linked, and tables are constructed that indicate the indexing of these documents. Whenever an entirely new search term is supplied by the requestor, an unindexed search into the vast reaches of the Internet or intranet is performed, and the new documents found are then automatically analyzed for word and phrase content, compared to the word and phrase content of the indexed documents already present within the system (categorization), and then incorporated into the indexed database for future reference. The system thus learns as it receives new questions and encounters new documents and thereby expands its indexed knowledge base over time, giving improved performance as the system is exercised.

With reference to FIG. 11, a typical hardware environment for the present invention is disclosed. The system is accessed by the requestor's PC 1102 which is equipped with a browser 1104 and which contains status information 1106 concerning the requestor's previous search activity, as will be explained. The PC 1102 communicates over the Internet or over an intranet 106 and through a firewall 1110 and router 1112 with one of several web servers 1114, 1116, 1118, and 1120 that contain the interactive retrieval system procedure 100 that is depicted in overview in FIG. 1.

The router 1112 routes the incoming queries from many requestor's PCs uniformly to all of the web servers that are available. Accordingly, a requestor does not know which web server a requestor will be accessing, and the requestor will typically access a different web server each time he or she submits a search term or answers a question posed by the system. Accordingly, each web server 1114, 1116, 1118, and 1120 contains the same identical processing procedure shown in FIG. 1 but relies upon the requestor's PC 1102 to submit status information 1106 along with each submitted search term or submitted answer to a question posed by the system and to thereby advise the web server 114 (etc.) as to where the requestor is in the process of completing a given document retrieval operation and dialog.

The web servers 1114 (etc.) access a database engine 1124 over a local area network or LAN 1122. The database engine 1124 maintains a knowledge database 200 the details of which are shown in FIG. 2. This knowledge database contains a list of the previously-used query terms 214 and also a record of the indexing of the documents that contain those query terms 216 and 218, as determined by either manual or automatic indexing, as will be explained below. The database engine 1124 may also optionally contain requestor profile information and the type of information that the requestor is interested in. This may be used for a variety of purposes, including the selection of advertising for presentation on the requestor's PC 1102 in conjunction with searches such that the advertising corresponds to the interests of the requestor.

When a web server 1114, etc., encounters a new search term not already in the database 200, the web searcher 1114 calls upon a search engine 1128 to conduct a new search of the Internet or intranet for documents that contain that particular search term. The results returned by the search engine 1128 are then processed by the web server 1114 in a manner which is described below such that the search term (called a query word in FIG. 2), any newly-found documents (called URLs in FIG. 2), and the indexing of those documents (called TOPICS in FIG. 2) is recorded in the knowledge database 200 for use in implementing and speeding future searches.

Periodically, the web servers 1114, etc., call upon the search engine 1128 to reexamine previously found documents to update and maintain the database 200 and to keep the entire system fully operational and up-to-date.

Referring now to FIG. 1, the procedures that comprise the interactive retrieval system 100 are illustrated in block-diagram overview. Requestor or user interface procedure 102, in the form of a downloadable web page containing HTML and/or Java commands and the like, is established on each of the web servers 1114 (etc.) at a web address that any requestor may access (using a browser 1104 such as Netscape's Navigator or Microsoft Explorer) and thereby have a search query form downloaded from one of the web servers 1114 (etc.) and painted upon the face of the requestor's PC 1102 display (not shown). In the preferred embodiment of the invention, this display presents the picture of a woman with whom the requestor is hypothetically communicating, thereby adding a human touch to the interactive query process and simplifying the introduction of this system to beginners. In addition to possible advertising, this initial display will normally contain a window in which the requestor can type a search term and then, by striking the enter key or by clicking on a button labeled GO or SUBMIT, have the search term transported back over the Internet or intranet to one of the web servers 1114 (etc.). The search term is typically a single word, but it may also be several words or a phrase.

At the heart of the retrieval system software installed on the web server 1114 (etc.) is the query processing procedure 400, the details of which are shown in FIG. 4. When the requestor supplies a search term to the query processing program 400 that the system has encountered before, the query processing program interacts directly with the knowledge database 200 to generate questions for the requestor which are displayed to the requestor or user by the user interface procedure 102 and which are lists of topics that are linked by tables to the documents which contain the search term supplied. Ultimately, after asking one or more such questions and receiving back replies, the system retrieves a list of document web addresses or URLs (uniform research locators) to display upon the requestor interface 102 to the requestor, along with document titles, so that the requestor may browse through the documents. In the case of search terms encountered previously, all of this is done without the assistance of the remaining software elements shown in FIG. 1.

When a search term is received that has not been processed previously, before proceeding as described above, the query processing procedure 400 launches a live search for the term on the Internet or intranet using the live search procedure 500 the details of which are shown in FIG. 5. The documents captured by this live search are then analyzed by the analysis program 700 for their word and phrase content and are then assigned index topics (or categorized) by the categorizing procedure 1000. The knowledge database 200 is then updated with the new document URLs plus the indexing of those documents as well as the new search term (or query word), and then query processing 400 proceeds in the normal manner as was described briefly above.

Periodically, it is necessary to recheck the documents to see if they still exist out on the web and to see if any of them have been changed. A timer 104 periodically triggers the update and maintenance procedure 600 to perform these functions using the analysis procedure 700 and the categorizing procedure 1000 to re-index documents that have been changed and also to remove query words from the database 200 when changes to the knowledge database 200 make it necessary for a query term search to be rerun as a live search if and when that same query term is encountered in the future.

The system is initialized through training using a small initial database that has been manually indexed such that each document in the training database is manually assigned to one or more index terms or categories or topics. This is done by a setup procedure 300 in conjunction with the same analysis software 700 that is used to analyze the results of live searches and to perform update and maintenance activities, as has been explained.

The first step in establishing an operative interactive retrieval system 100 is to exercise the set-up procedure 300, the details of which are shown in FIG. 3 This procedure 300 will be described in conjunction with a description of certain tables within the knowledge database shown in FIG. 2.

The process of setting up a retrieval system begins by the assembly of a database that has been indexed manually by the assignment of topics to the documents. Indexed databases are commercially available. For example, a newspaper will typically have a hierarchical index of all of its published articles, with the articles themselves also stored, in full-text machine-readable form, on a computer. Such an existing database would already satisfy the requirements of step 302, that of defining topics for inclusion in the topic table 208 shown in FIG. 2.

The goal, when it comes to assigning topics to documents manually, is not to define extremely narrow topics which are then assigned to a very limited number of documents, where individuals reading the documents might disagree with one another over which narrow topic subdivision each document is to be assigned to. Contrary to this, the topics are preferably broad and precise categorizations with which almost no one would disagree as to the assignment of the documents. Accordingly, news documents might be classified in accordance with broad topics such as sports, politics, business, and other such broad categorizations. The idea is to define topics which are easy to assign to the documents, yet which precisely divide the documents into separate categories for purposes of slicing up the database precisely and improving the precision of searching without degrading the recall of pertinent documents to any significant degree.

Step 304, the development of topic combinations for entry into the table 212, is presently a manual operation intended to improve the performance of the retrieval system. It has been found that the text searching and text comparison aspects of the present invention will sometimes result in a document being determined to be related relatively equally to two differing topics. If these topics appear in the topic combination table 212, then the table will indicate a third main topic to which the document should be assigned. This third topic may be either one of the two topics, or it may be some different topic. The topic combination table has been found to be helpful because the categorization of a document to a topic by means of its word and phrase content, as described below, will sometimes produce ambiguous results that can be overcome by this intervention.

Step 306 in FIG. 3 calls for finding a set of documents for each topic. In the case of a pre-existing indexed newspaper database or the like, this has already been done, and it is only necessary to generate format conversion software which can read in the documents and their index assignments and build from those documents the word table 202, the topic table 208, and the word combination table 210.

The entire process of building these tables begins with the analysis of the set of documents by the analysis procedure 700, a procedure that is described in detail in FIGS. 7, 8, and 9 and that is used not only in setting up the system but also to assign topics to documents found as a result of live searches performed as shown in FIG. 5. The analysis program 700 is described at a later point. Suffice it to say for now that the analysis program 700 goes through each indexed document and distills out of those documents the most commonly occurring words in each document that are searchable—that is, useful for distinguishing one document from another (excluding such non-useful, non-searchable words as and, if, etc.) These words are then entered into the word table 202, shown in FIG. 2, such that a word number is assigned to each of these words. Next, the analysis procedure 700 searches for these same words and the adjacent or neighboring searchable words within the same document, and it selects from each document those word pairs that occur most frequently. The words in these searchable word pairs, to the extent not presently in the word table 202, are then assigned entries in the word table 202 and are thus also assigned word numbers.

Next, the word combination table 210 is assembled. All the topic names are first entered into the topic table 208 and are thus assigned topic numbers. Since the documents have all been assigned to topics, the word pairs associated with each document may then be assigned to the same topic numbers that are assigned to the corresponding documents. Accordingly, all the word pairs are entered into the word combination table 210 along with the topic number that is assigned to the document within which each word pair appears. In addition, the word combination table 210 contains an indication of the quantity of the word pairs that were found. In this simple manner, the set-up procedure creates a word combination table which associates word pairs with topics. The topic names appear in the topic table, and the words themselves appear in the word table. The word combination table contains nothing but numbers that are references to the other two tables, as indicated by the arrows shown in FIG. 2. In essence, the word combination table relates document word patterns to topics. This table is later used to assign topics to documents found during live searches, documents that are not manually indexed.

Next, and to the extent necessary, the topic combination table 212 is established to allow documents that appear to be associated with multiple topics to be assigned to one or the other of those two topics or to a third topic in cases where the assignment of a document to a single topic is ambiguous. The topic combination table also contains a factor entry as part of each table entry. The number of occurrences of the word pairs signaling two different topics in a single document is required to be almost the same, varying by no more than the factor amount, before the topic combination table is applied to trigger the alternate selection of a main topic. In the example shown in the table 212, the factor is 0.2, meaning that the word pairs suggestive of one topic must appear in a quantity within the document that is between 0.8 (1.0 minus 0.2) and 1.2 (1.0 plus 0.2) times of the number of occurrences of the word pairs that indicate the other topic before the topic combination table is used. Different factor values may be assigned to different word pairs to optimize the performance of the retrieval system, and other similar techniques may be employed. As in the case of the word combination table 210, the topic combination table 212 contains only topic numbers which refer back to the topic table 208 that contains the actual names of the topics.

That completes the process of setting up the retrieval system 100. If desired, and if the documents that have been used to create entries in the word combination table 210 are available on the Internet or on an intranet and accordingly have assigned to them URL addresses, then these documents, and up to four related topic numbers, may be entered into the URL table 218 in anticipation of these same documents later being retrieved because they contain a requestor's search term. But this step is optional. The exercising of the interactive retrieval system will, in the normal course of things, ultimately cause all documents that contain query search terms or interest to the requestors to be found and entered into the URL table 218 at a later time. The one advantage of entering these documents into the URL table 218 during the setup procedure is that the manually-assigned topics will then be assigned to these documents, and there is no chance that the automatic topic assignment procedure (described later) might produce a slightly different topic assignment from that done manually. However, the main purpose of the set-up procedure is not to load the URL table 218 with documents but to load the word combination table 210 with the patterns of words that indicate a document relates to a particular topic.

In the discussion that follows, the requestor is normally a human user who wishes to have a search performed. It is also possible that the requestor might be some other computer system utilizing this invention as a resource and adding value of its own to the process.

FIG. 4 presents a detailed block diagram of the query processing procedure 400 carried out by the present invention. The process begins at step 402 when the requestor is prompted to supply a search term, typically a word, but possibly several words or a phrase or even words and phrases with logical connectors. Either at that time, or perhaps at an earlier stage, the requestor may be queried as to how to limit the scope of a search at step 404. For example, the requestor may wish to search only highly authoritative documents such as those published by the government in statutes, regulations, or other pronouncements. The requestor may wish to include less authoritative but still generally reliable sources, such as newspaper and magazine articles. Or the search may be broadened further to include the scholarly publications of universities and science foundations. Even broader searches may include the publications of corporations, documents that may be more biased and less reliable but still authoritative. Finally, the requestor may wish to search not only the above sources but also documents supplied by individuals on individual websites whose reliability is not necessarily high. Such documents may still be useful. A table may be displayed to the requestor enabling the requestor to check the boxes of the various types or classes of information that the requestor wishes to see. Alternatively, the requestor may simply be asked to decide on the level of authoritativeness of the documents that are to be displayed: government and official publications only; government publications plus newspaper articles; government publications and newspaper articles plus university and scientific documents; these sources plus corporate information; and all sources of information, including information found on individual web sites.

At step 406, the search term is analyzed. In part, this analysis involves normalizing the search term with respect to such things as spelling and inflection, normalizing the case of nouns and the tense of verbs, and also normalizing distinctions due to gender. Much of this may be language specific. In German, the β character might be translated into a ss, or vice versa. Inflection might also be normalized for search and comparison purposes through the addition or subtraction of umlauts or other language-specific accent marks.

Next, a synonym dictionary is checked at 206 to see if synonyms exist for the search term, and thus a search may be expanded to cover multiple terms having the same semantic meaning so that documents which do not contain the search query word but which contain a related synonym will also be included within the scope of the search.

While multiple search terms may have been supplied, the discussion which follows will assume for the sake of simplicity that only one term has been produced which needs to be processed. However, if multiple search terms need to be processed, the steps described below will simply be repeated for each term so as to increase the number of documents captured and analyzed and categorized. Likewise, the use of logical connectors might increase or decrease the number of documents that are analyzed and categorized, or their application might be postponed to a later stage of the process.

At step 408, a check is made to see if the search term already exists in the query word table 214. By way of explanation, every time a new search term is submitted by a requestor, the search term is added to the query word table 214 as a new entry, and then a live Internet or intranet search is performed as described in FIG. 5. But once such a live Internet search has been performed, together with the analysis and categorization of the documents captured, the relevant information is preserved in the URL table 218 and in the query linkage table 216, and accordingly further live searching for that same search term is not needed until the system is updated and some of the documents are found to have been changed or deleted. Accordingly, if the query word is found already to exist in the query word table 214, then the live search procedure 500 can be bypassed, and processing 30 continues with step 412 using the knowledge database shown in FIG. 2. In that case, no live Internet or intranet search would be required. But if the query search term is not found in the query word table 214, then at step 500, a live search is performed as explained in FIG. 5. If documents are found that contain the query term at 410, then processing continues at step 412. Otherwise, the search process is halted at step 411, and a report is given to the requestor that no documents were found containing the submitted search term.

At step 412, it is presumed that a live search has already been performed for the search term and that the set of documents containing that term have already been analyzed and categorized, as will be explained below in conjunction with the description of FIG. 5. All documents containing the search term are thus listed in the URL table 218 along with up to four topics to which each document relates. In addition, the table 218 contains an indication of the type of each document (government publication, newspaper article, university or scientific publication, etc.) if that information is available.

The search term is looked up in the query word table 214, and then the query word number is searched for in the query linkage table 216. All the URL numbers associated with the search term are retrieved from the query linkage table 216. In the case of synonyms, all the URL entries for all of the synonyms are retrieved from the query linkage table 216.

Next, the URL table 218 is checked, and for each of the URLs captured, the first of the four topic numbers is retrieved. At step 414, if only one topic is assigned to all the documents, then the search is done, and the list of document URL addresses and titles is displayed to the requestor at step 419. The requestor is then permitted to browse through the URLs at step 420, displaying and browsing through the documents.

If more than one topic is found to be assigned to the documents, then at step 415 a list of the first topic in the table 218 for each document is displayed to the requestor, and the requestor is prompted to select one of the topics to thereby narrow the scope of the search to the set of documents so indexed.

At step 416, the requestor selects one of the topics, and this information is conveyed back to the system 100 along with other information sufficient to define to the system 100 the current state of the requestor's search such that the web servers 1114 (etc.) do not need to retain any information about any given requestor and the status of any given search. This information is maintained as part of the status information 1106 within the requestor's PC.

The selected topic narrows the scope of the search to certain URLs within the URL table 218 that contain the selected topic's number. At step 418, the system next goes to the second of the four topic numbers (second from the left—57—in the RELATED TOPIC #s column of table 218) for those documents within the URL table that contained the selected topic number, and it assembles a list of different second-level topics. Once again, if there is only one second-level topic, or if there are none, then the list of document URLs and names is displayed to the requestor at step 419, and the requestor is permitted to browse through them. However, if there are several second-level topics, then the list of second-level topics is displayed to the requestor at step 415, and the requestor is again asked to select one topic at step 416.

This process of displaying a list of topics to the requestor and having the requestor select a topic or subtopic occurs a maximum of four times, since there are a maximum of four topic numbers listed in the URL table 218 for each document. Accordingly, there can be anywhere from zero to four such dialogs, with the system asking the requestor to select from a list of topics, and with the requestor responding by designating a single topic to narrow the focus of the search and to thereby improve the precision of the search substantially without suffering a reduction in the recall of relevant documents.

The procedure for performing a live search is set forth in FIG. 5. Whenever a word supplied by the requestor is not found within the query word table 214, the word is a new one to the system 100, and the system must take steps to add to its knowledge database documents that contain this word. It must also analyze these documents and categorize them—assign them to topics. At step 502, the system commands a conventional Internet or intranet search engine 1128 to search the Internet or intranet for the URLs of documents that contain the word. In that preferred embodiment of the system 100, the system captures up to but no more than one thousand documents. This is far more documents than a human requestor would normally wish to browse through when conducting a conventional search of the Internet or intranet without using the present invention. Accordingly, the present system is able to achieve a higher recall rate than that achievable using a normal Internet or intranet systems. While the recall rate is high, it is to be expected that many, and perhaps most, of the documents captured at this stage will be irrelevant to the requestor's intentions, and thus at this stage search precision is quite low.

Next, at step 700, the system analyzes the set of documents retrieved, as will be explained below. Briefly summarized, the system determines the most commonly-occurring searchable words within each document, and then it identifies the pairing of these words with other adjoining searchable words thus associates a set of word pairings with each document. This set of word pairings constitutes a word pattern that characterizes each document and that can be used to match a document to other indexed documents and thus to assign one or more topics to each document in a later categorization step.

At step 1000, the document is categorized, as will be explained below. Briefly summarized, the word pairs characterizing each document are matched against word pairs in the word combination table 210, which the table relates to topics, and up to four topics may thereby be assigned to each document.

Finally, at step 504, the query words are added to the query word table 214, and the documents are entered into the URL table 218 along with their assigned topic numbers and URL identifiers. The query linkage table 216 is then adjusted so that all the documents entered into the table 218, identified by their URL number, are linked by the table 216 to the query words in the query word table 214 that the documents contain. In this manner, a thousand documents containing the search word are retrieved, analyzed, and categorized in an automatic fashion to the extent that their word patterns are similar to the word patterns of the manually indexed documents. The query words, documents, and the document indexing is thus entered into the knowledge database for use not only in processing this search but also in greatly speeding the processing of subsequent searches for the same word. Of course, a document encountered in a previous search is already indexed, categorized, and entered into the table 218. Only the query linkage table 216 needs to be adjusted to link such documents to the new query word.

Periodically, it is necessary to go through the knowledge database to maintain it and update it so that it reflects the current status of the documents in the Internet or intranet. In FIG. 6, the update and maintenance procedure 600 is presented. This procedure 600 is executed periodically, as indicated at step 602, by some form of timer 104 (FIG. 1). However, the documents relating to some topics may be relatively stable and unchanging, while other documents relating to such things as current news events may change daily or even more frequently. Accordingly, the system designer may cause certain types of documents and documents related to certain topics to be updated much more frequently than others.

The update procedure begins by taking a list of the URL addresses contained in the URL table 218 and presenting the list to the search engine 1128 (FIG. 1) to find out which of the documents have been deleted and which have been updated or modified. To facilitate this, the document URLs should preferably be accompanied by the date upon which the documents were retrieved from the Internet to facilitate the web crawler in determining whether or not they have been modified. At step 606, the web crawler or search engine 1128 returns lists of those URLs which have been deleted or updated, and (optionally) those that have been added new to nodes where the documents are of such importance that the system preloads all the documents from those particular nodes.

At step 608, each document listed is examined, and different steps are executed depending upon whether a document has been deleted from the system, has been updated with a replacement, or is a new document added to a node where the system tests for the presence of new entries.

At 610, if a document has been either deleted or updated, it must be removed from the knowledge database. For each such document, all entries of the document's URL number are deleted from the query linkage table. In addition, the query words associated with the deleted URL are also removed from the query word table 214. Accordingly, in the future, if any of these query words are submitted again, the system will be forced to retrieve all of the documents containing these query words anew and to reanalyze and recategorize these documents and re-enter them into the URL table 218.

Optionally, at step 612, if a document has been updated, it may be analyzed 700 and categorized 1000, and its entry in the URL table may be updated to reflect the topics that it now contains. If these steps are taken, then in the future, if a search word not present in the query word table causes a live search to be performed and if such a document is captured as part of the live search, the system will not need to analyze and categorize the document, since the analysis and categorization is already present within the URL table 218. The system will simply enter the search word into the query word table 214, and add the URL number of the document, along with the URL number of other documents linked to that query word, to the query linkage table 216.

If the system is designed to detect new documents at particular nodes, those new documents can also be analyzed 700 and categorized 1000 so that they may be entered into the URL table 218 in advance of those documents having been found because they contain a particular search word. Once again, later searches for search words that these documents contain will proceed more rapidly following a live search, since the document analysis and categorization steps will already have been completed and the URL table for such documents 218 will have already been updated.

FIGS. 7, 8, and 9 present a block diagram of the analysis procedure 700 that identifies key words and key word pairs within a document and that thereby identifies a word pattern that characterizes the information content of the document.

Analysis begins by converting the document from whatever format it is in, typically HTML with possibly the presence of Java scripts, into a pure ASCII document completely free of programming instructions, stylistic instructions, and other things not relevant to retrieval of the document based upon its semantic information content.

At step 704, all punctuation and other special characters are stripped out, leaving only words separated by some delimiter, such as the space character. At step 706, ambiguities in the words caused by variations in inflection, by synonyms, by variable use of diacritical marks, and by other such language specific problems are addressed. For example, the ß in German might be replaced by ss, umlauts (ä and ö) may be added or stripped, irregular spellings may be adjusted, and certain words that are interchangeable with synonyms may be reduced to one particular word for consistency in word matching.

Next, at step 708, the system strips out of the text the common, non-searchable words such as the, of, and, perhaps, words and phrases that occur commonly but that have little or no value in distinguishing one document from another. It can be expected that different implementations of the invention will vary widely in the ways in which they address these types of problems.

At step 710, the system counts the number of times each remaining word is used within each document.

In FIGS. 8 and 9, step 712 indicates that the steps 714–724 are carried out with respect to each individual document that is to be analyzed.

At step 714, the words within a document are arranged in order by their frequency of occurrence within the document, such that the most frequently occurring words are at the top of the list. At step 716, a first linkage of the words within the document are formed in document word order. Then, at step 718, a second linkage is formed of the most frequently used words which appear at the top of the sort list prepared at step 714.

A limit is placed upon the number of words within each document that are included in the analysis. In the preferred embodiment of the invention, in the case of a live search, the system simply retains the thirty most frequently used words in the second linkage.

If a search is not a live search, but rather one performed during initial system setup (FIG. 3) or during system update and maintenance (FIG. 6), then the number of words retained in the second linkage is adjusted in proportion to the size of the document. The test used in the preferred embodiment of the invention is that if the frequency of occurrence of a particular word divided by the document size (measured in Kilobytes) is greater than or equal to 0.001, then the word is retained. Otherwise, it is discarded.

Next, for each occurrence within a document of a word in the second linkage of the most frequently occurring words, the system scans the first linkage (of the words arranged in document order), finds all occurrences of each of the words in the second linkage, and then identifies words in the first linkage adjacent to or neighboring each occurrence in the first linkage of words from the second linkage. In this manner, the system identifies pairings of the most frequently used words in each document with their immediately adjacent searchable neighbors. At step 722, for each document, a count is made of the number of times each unique pairing of two such words occurs within each document.

At step 724, only the most frequently occurring of these pairings of two words are retained. In the preferred embodiment of the invention, a pairing of two words is retained if the number of occurrences of the pairing divided by the number of occurrences of the word in the pair that was among the most frequently occurring words in the document, all multiplied by one thousand, is greater than the threshold value of 0.001. Otherwise, the pairing is discarded.

Finally, at 726, for each document a list is formed of the retained word pairings and the quantities of occurrences of each word pairings. This completes the document analysis procedure.

The categorizing procedure 1000 is set forth in block diagram form in FIG. 10. As indicated at steps 1002, the remaining steps 1004 through 1010 are performed for each document separately.

Categorizing begins by taking each retained pairing of words for the document (produced through analysis) and looking the pairing up in the word combination table 210 of the knowledge database. Some of the pairings may not be found in the word combination table 210, and these pairings are discarded. The remaining pairings, for which matching entries are found in the table 210, are assigned the topics that are linked to those matching entries by the table 210.

At step 1006, the number of word pairings assigned to each topic are summed up, and the four topics assigned to the highest number of pairings within the document are then selected and retained as the four topics that characterize the topic content of the document. These four topics are arranged in order by the number of pairings each is assigned to, with the topic having the most pairings first, the topic with the next most pairings second, and so on.

At step 1008, the topic combination table 212 is checked. If two topics within the document are associated with nearly the same number of pairings, within the limits indicated by the factor entry in the topic combination table for those two topics, then the main topic number indicated by the topic combination table 212 is selected and is substituted for both of those topics to characterize the document.

Finally, the URL for each document is entered into the URL table 218 along with a number identifying the document type. The four selected topics, identified by their numbers, are also entered into the table 218. This completes the document categorization process.

To illustrate in more detail how the system works, examples of several typical but simplified system operations are set forth below.

The knowledge database 200 of the system is presumed to contain the following information:

The table 208 contains:

| Topic Number | Topic |
|---|---|
| 1 | Baseball |
| 2 | Medicine |
| 3 | Rules |
| 4 | Medicine in Sports |

The topic combination table 212 contains:

| Main Topic Number | Topic Number 1 | Topic Number 2 |
|---|---|---|
| 4 | 1 | 2 |

The query word table 214 contains:

| Query Word Number | Word |
|---|---|
| 1 | Pitcher |
| 2 | Headache |
| 3 | Quarterback |
| 4 | Baseline |
| 5 | Alka-Seltzer |

The word combination table 212 contains:

| Word Number | Neighbour Word Number | Quantity | Topic Number |
|---|---|---|---|
| 3 | 4 | 2 | 3 |
| 2 | 5 | 3 | 2 | the query linkage table 216 contains:

| Query Word Number | URL Numbers |
|---|---|
| 1 | 47, 59, 23 |
| 2 | 19, 17 |
| 5 | 20 |

The document URL table 218 contains:

| URL Number | URL | Class | Topic Numbers |
|---|---|---|---|
| 17 | http://... | Official | 2,9,13 |
| 19 | http://... | Company | 2,8,33 |
| 20 | http://... | Media | 2 |
| 23 | http://... | Individual | 1,3,4 |

EXAMPLE 1

Searching Through Multiple Hierarchy Levels

If the requestor enters the search term headache, the system looks up that word in the dictionary 204 to ensure correct spelling and also addresses problems of inflection, etc. Next, the system checks through the list of synonyms 206, and if any are found, the system expands the search to search for both terms. When all of these preliminary steps have been completed, the system looks up the word headache in the query word table 214 to see if this term has been searched for previously. In this case, the term has been searched for previously, and accordingly, headache appears as a query word that the table 214 assigns the query word number of 2.

Having identified the word and discovered that it had been searched for previously, the system now searches the query linkage table 216 for and retrieves from that table the URL table 218 numbers of all the documents that contain the word. In this case, the URL numbers 17 and 19 are found in the query linkage table 216.

Accordingly, the system next checks the URL table 218 entries for documents assigned URL numbers 17 and 19, and it examines the topic numbers assigned to the two documents 17 and 19. As can be seen, document 17 is assigned the topic numbers 2, 9, and 13, while document 19 is assigned the topic numbers 2, 8, and 33. The leftmost of these topics (2 and 2) are ranked higher in the hierarchy of topics, since the leftmost topics are associated with more word pairings in the document than the other topics, as has been explained. Accordingly, both of the documents are most strongly linked to topic number 2, which the topic table 208 reveals is medicine .

The system may now display to the requestor the word medicine and the number 2 indicating the number of documents that have been found related to the entered search term. The requestor will, of course, select this topic. (In some implementations, the display of a single topic may be bypassed as unnecessary.) The system then responds by displaying all the topics listed at the second level of the hierarchy, in this case, the topics numbered 8 and 9 (the names of these topics are not included in the illustrative topic table). These two topics are then displayed to the requestor each followed by one, the number of documents relating to each topic, and the requestor is prompted to select one or the other. Assuming the requestor selects topic number 8, then the system displays to the requestor the URL address and the document name corresponding to the document assigned the URL number 19 in the URL table 218. The third hierarchical topic 33 is not displayed to the requestor. Since it is the only topic left, there is no reason to display it.

EXAMPLE 2

Searching Through Only One Hierarchical Level

Assuming now that the requestor enters the search term Alka-Seltzer, the system will first check that word against the dictionary 204 and synonyms 206 tables described in Example 1 and address inflection and other problems. After all the necessary checks have been completed, the system goes to the query word table and learns that Alka-Seltzer has previously been searched for and has been assigned the query word number 5. Accordingly, the system then looks up this word number in the query linkage table 216 and learns that only a single document, assigned the URL number 20, contains that word. With reference to the URL table 218, the document 20 is only assigned to the one topic number 2. Accordingly, there is no need for interaction with the requestor. The single document URL address and document title are displayed to the requestor so that the requestor may decide whether to browse through the document.

EXAMPLE 3

The Search Term Does Not Appear in the Query Word Table

Assume the requestor enters the word heartache and that the system cannot find this in the query word table 214, since this search has never been performed before. After addressing spelling, inflection, and synonym problems, the system commences a live search (FIG. 5) and captures a number of documents that contain heartache .

Through the process of analysis 700 (FIGS. 7, 8 and 9) and categorizing 1000 (FIG. 10), the system adds all the captured documents and the related assigned topics to the URL table 218. This process involves finding adjoining word pairings within each document, looking them up in the word combination table 210, retrieving the associated topic numbers from the table 210, and then going through the process described above of selecting up to four most relevant topics for each document and placing the topic numbers of those four topics, along with the URL address of each document, into the URL table 218. The query linkage table is then adjusted to link heartache in the query word table to the documents found.

After completing these steps, the system continues as described in Example 1 above to complete the search.

EXAMPLE 4

Addressing Language-specific Problems

In the spoken German language, there is a difference in spelling between the cases of a noun (i.e., nominative, genitive, dative, etc.). Accordingly, the word Kopfschmerz may be entered as der Kopfschmerz, des Kopfschmerz, dem Kopfschmerz (etc.), where all of these entered words mean essentially the same thing. The document might also contain the plural form of Kopfschmerz, which is die Kopfschmerzen. All of these different forms of inflection are converted downwards into the same basic ground form of the noun for searching and comparison purposes.

Likewise, the system must also contend with different inflections of a verb. For example, laufen, has a first person form ich laufe, a second person form of du läufst, and so on. During analysis, all of these variant verb forms must be flattened to the ground form so as to reduce the number of words that have to be analyzed and to improve the semantic performance of the system.

While the preferred embodiment of the invention has been described, it is to be understood that numerous modifications and changes will occur to those skilled in the art of retrieval system design that fall within the true spirit and scope of the invention. The claims appended to and forming a part of this specification are therefore intended to define the invention and its scope in precise terms.

What is claimed:

1. An interactive document retrieval system designed to search for documents after receiving a search query from a requestor, said system comprising:

a knowledge database containing at least one data structure that relates word patterns to topics; and a query processor that, in response to the receipt of a search query from a requestor, does the following searching for and trying to capture documents containing at least one term related to the search query, if any documents are captured, analyzes the captured documents to determine their word patterns, categorizing the captured documents by comparing each document's word pattern to the word patterns in the database, and when a document's word pattern is similar to a word pattern in the database, assigning to that document the similar word pattern's related topic, presenting at least one list of the topics assigned to the categorized documents to the requestor, and asking the requestor to designate at least one topic from the list as a topic that is relevant to the requestor's search, and granting the requestor access to the subset of captured and categorized documents to which topics designated by the requestor have been assigned;

wherein the word patterns determined by analysis are pairings of words, each pairing comprising two searchable words with one word occurring frequently within the document and the other word occurring near the one word frequently within the document.

2. A document retrieval system in accordance with claim 1 wherein the word patterns determined by analysis are commonly occurring and searchable phrases.

3. A document retrieval system in accordance with claim 1 wherein the word patterns determined by analysis are pairings of words, each pairing comprising two searchable words.

4. A document retrieval system in accordance with claim 3 wherein one word in each pairing occurs frequently within the document and the other word in each pairing occurs near the one word frequently within the document.

5. A document retrieval system in accordance with claim 1 wherein the knowledge base is initially constructed by analyzing indexed documents to which topics have previously been assigned, thereby determining the indexed document's word patterns, and then storing in the knowledge database these word patterns for the indexed documents and the topics assigned to these documents, and then relating the word pattern of an indexed document to the topics assigned to that same indexed document.

6. A document retrieval system in accordance with claim 5 wherein the word patterns determined by analysis are commonly occurring and searchable phrases.

7. A document retrieval system in accordance with claim 5 wherein the word patterns determined by analysis are pairings of words, each pairing comprising two searchable words.

8. A document retrieval system in accordance with claim 7 wherein
one word in each pairing occurs frequently within the document and the other word in each pairing occurs near the one word frequently within the document.

9. A document retrieval system in accordance with claim 1 wherein
the search query contains a phrase, and the term searched for is that phrase.

10. A document retrieval system in accordance with claim 1 wherein
the search query contains at least one word, and the term searched for is at least one searchable word taken from the search query.

11. A document retrieval system in accordance with claim 1 wherein
the search query contains several words, the term searched for is a searchable word taken from the search query, and several words in the search query are searched for in separate searches.

12. A document retrieval system in accordance with claim 1 wherein
the search query contains at least one operator and at least one word, and the presentation of documents to the requestor scope is limited by the search query.

13. A document retrieval system in accordance with claim 1 wherein
the knowledge database retains a record of words previously searched for, the documents captured by such previous searches, and the index terms assigned to the captured documents, and the knowledge database also retains linkages between the words previously searched for and the documents captured by such previously-conducted searches, such that the search, analysis, and categorizing steps may be bypassed when a word previously searched for is encountered in a later search query.

14. A document retrieval system in accordance with claim 13 wherein
the knowledge base is initially constructed by analyzing indexed documents to which topics have previously been assigned, thereby determining the indexed document's word patterns, and then storing in the knowledge database these word patterns for the indexed documents and the topics assigned to these documents, and then relating the word pattern of an indexed document to the topics assigned to that same indexed document.

15. A document retrieval system in accordance with claim 13 wherein
the knowledge base is maintained by periodically checking to see if documents entered into the knowledge base have changed or been deleted from the searchable universe of documents, and if they have, then deleting all reference to such documents, as well as the words searched for that caused their capture, from the knowledge base, thereby forcing all searches for such words likely to capture such documents to be repeated anew if encountered in a later search query.

16. A document retrieval system in accordance with claim 13 wherein
the knowledge base is maintained by periodically checking to see if documents entered into the knowledge base have been changed, and if so, reanalyzing and recategorizing such documents and also removing from the knowledge base linkages between such documents and words that they no longer contain.

17. A document retrieval system in accordance with claim 1 wherein
the knowledge base is updated by periodically checking for new documents at some locations within the searchable universe of documents, and analyzing and categorizing such documents prior to those documents being captured by a search.

18. A document retrieval system in accordance with claim 1 wherein
said knowledge database includes a topic combination table containing replacement topics for certain combinations of other topics that may appear within a captured document and that are assigned to such a document as a replacement for said other topics to improve categorization.

19. A document retrieval system in accordance with claim 1 wherein
plural topics are assigned to at least some documents during categorization and are arranged hierarchically and linked to the at least some documents in the knowledge database, and wherein as many lists of topics as there are hierarchical topics associated with the categorized documents are presented to the requestor in sequence, such that the requestor designates multiple topics and subtopics, and such that search precision is improved by eliminating documents irrelevant to the requestor's designated topics from those to which the requestor is granted access.

20. A document retrieval system in accordance with claim 19 wherein
The presentation of topics to the requestor at any given hierarchical level is suppressed when all the documents are associated with the same topic at that level.

21. A document retrieval system in accordance with claim 1 wherein analysis includes the following steps:
reduce the document data to a list of words;
address inflection and synonym problems;
eliminate non-searchable words;
select the most frequently occurring words; and
select frequently-occurring pairings of those words with adjacent words in the document.

22. A document retrieval system in accordance with claim 21 wherein
up to a predefined number of the most frequently occurring words are selected.

23. A document retrieval system in accordance with claim 22 wherein
the predefined number is in the neighborhood of 30.

24. A document retrieval system in accordance with claim 21 wherein
a word occurs frequently if the number of times it appears within a document divided by the total word content of the document exceeds a predetermined value.

25. A document retrieval system in accordance with claim 24 wherein
the predetermined value is in the neighborhood of 0.001.

26. A document retrieval system in accordance with claim 21 wherein
a pairing occurs frequently if the number of occurrences of a given pairing within a given document, divided by the number of occurrences of the frequently-occurring adjacent word of the pairing within the document, is greater than a predetermined value.

27. A document retrieval system in accordance with claim 26 wherein
the predetermined value is in the neighborhood of 0.0001.

28. An interactive document retrieval system in accordance with claim 1 wherein:
the query processor is installed in at least one web server connecting to the Internet or to an intranet;
the knowledge database is installed on a database engine accessible to the web server;
the requestor communicates with the web server using a computer having a browser also connecting to the Internet or to the same intranet; and
searches are performed by a search engine accessible to the web server and conducting searches on the Internet or on the same intranet.

29. A document retrieval system in accordance with claim 28 wherein
multiple web servers are employed, interconnected to the Internet or to an intranet by a router and a firewall; and
the status of any given search procedure is maintained on the requestor's computer and is resubmitted to one of the web servers each time a search query or designation is submitted by the requestor.

30. An interactive method of searching for and retrieving documents after receiving a search query from a requestor, said method comprising the steps of:
providing a knowledge database containing at least one data structure that relates word patterns to topics;
in response to the receipt of a search query from a requestor
searching for and attempting to capture documents containing at least one term related to the search query,
if any documents are captured, analyzing the captured documents to determine their text patterns,
categorizing the captured documents by comparing each document's word pattern to the word patterns in the knowledge database, and when a document's word pattern is similar to a word pattern in the database, assigning to that document the similar word text pattern's related topic;
presenting at least one list of the topics assigned to the categorized documents to the requestor, and asking the requestor to designate at least one topic from the list as a topic that is relevant to the requestor's search; and
granting the requestor access to the subset of captured and categorized documents to which topics designated by the requestor have been assigned;
wherein the word patterns determined by analysis are pairings of words, each pairing comprising two searchable words with one word occurring frequently within the document and the other word occurring near the one word frequently within the document.

31. A method of searching in accordance with claim 30 in which
the word patterns determined by analysis are commonly occurring and searchable phrases.

32. A method of searching in accordance with claim 30 which further includes
determining at least some word patterns that contain two searchable words.

33. A method of searching in accordance with claim 32 which further includes
having at least some word patterns contain one word that occurs frequently within the document and another word that frequently occurs near to the one word within the document.

34. A method of searching in accordance with claim 30 which further includes
constructing the knowledge base by analyzing indexed documents to which topics have previously been assigned, thereby determining the indexed document's word patterns, and then storing in the knowledge database these word patterns for the indexed documents and the topics assigned to these documents, and then relating the word pattern of an indexed document to the topics assigned to that same indexed document.

35. A method of searching in accordance with claim 34 which further includes
determining at least some word patterns that are commonly occurring and searchable phrases.

36. A method of searching in accordance with claim 34 which further includes
determining at least some word patterns that are pairings of words, each pairing comprising two searchable words.

37. A method of searching in accordance with claim 36 which further includes
determining at least some word pattern pairings in which one word in each pairing occurs frequently within the document and the other word in each pairing frequently occurs near to he one word frequently within the document.

38. A method of searching in accordance with claim 30 which accepts
at search queries that contain a phrase and that search for the phrase.

39. A method of searching in accordance with claim 30 which accepts search queries that contain at least one word and that search for the word.

40. A method of searching in accordance with claim 30 which accepts
search queries that contain several words and search for each word in separate searches.

41. A method of searching in accordance with claim 30 which accept
at least some search queries that contain at least one operator and at least one word and that search for the word and later use the operator to limit the scope of the documents presented to the requestor.

42. A method of searching in accordance with claim 30 which further includes
retaining in the knowledge database a record of words previously searched for, the documents captured by such previous searches, and the index terms assigned to the captured documents, and retaining within the knowledge database linkages between the words previously searched for and the documents captured by such previously-conducted searches, such that the search, analysis, and categorizing steps may be bypassed when a word previously searched for is encountered in a later search query.

43. A method of searching in accordance with claim 42 which further includes
initially constructing the knowledge base by analyzing indexed documents to which topics have previously been assigned, thereby determining the indexed document's word patterns, and then storing in the knowledge database these word patterns for the indexed documents and the topics assigned to these documents, and then relating the word pattern of an indexed document to the topics assigned to that same indexed document.

44. A method of searching in accordance with claim 42 which further includes maintaining the knowledge base by periodically checking to see if documents entered into the knowledge base have changed or been deleted from the searchable universe of documents; and if they have, then deleting all reference to such documents, as well as the words searched for that caused their capture, from the knowledge base, thereby forcing all searches for such words likely to capture such documents to be repeated anew if encountered in a later search query.

45. A method of searching in accordance with claim 42 which further includes maintaining the knowledge base by periodically checking to see if documents entered into the knowledge base have been changed, and if so, reanalyzing and re-categorizing such documents and also removing from the knowledge base linkages between such documents and words that they no longer contain.

46. A method of searching in accordance with claim 30 which further includes updating the knowledge base by periodically checking for new documents at some locations within the searchable universe of documents, and analyzing and categorizing such documents prior to those documents being captured by a search.

47. A method of searching in accordance with claim 30 which further includes including in said knowledge database a topic combination table containing replacement topics for certain combinations of other topics that may appear within a captured document, and assigning a replacement topic to such a document as a replacement for said other topics to improve categorization.

48. A method of searching in accordance with claim 30 which further includes assigning plural topics to at least some documents during categorization, arranging them hierarchically, and linking them to the at least some documents in the knowledge database, and presenting to the requestor in hierarchical sequence as many lists of topics as there are hierarchical topics associated with the categorized documents, such that the requestor designates multiple topics and subtopics, and such that search precision is improved by eliminating documents irrelevant to the requestor's designated topics from those to which the requestor is granted access.

49. A method of searching in accordance with claim 48 which further includes suppressing the presentation of topics to the requestor at any given hierarchical level when all the documents are associated with the same topic at that level.

50. A method of searching in accordance with claim 30 which further includes reducing the document data to a list of words;
addressing inflection and synonym problems;
eliminating non-searchable words;
selecting the most frequently occurring words; and
selecting frequently-occurring pairings of those words with adjacent words in the document.

51. A method of searching in accordance with claim 50 which further includes selecting up to a predefined number of the most frequently occurring words.

52. A method of searching in accordance with claim 51 in which the number selected is in the neighborhood of 30.

53. A method of searching in accordance with claim 50 which further includes determining whether a word occurs frequently by determining if the number of times the word appears within a document divided by the total word content of the document exceeds a predetermined value.

54. A method of searching in accordance with claim 53 wherein the predetermined value is in the neighborhood of 0.001.

55. A method of searching in accordance with claim 50 which further includes determining whether a pairing occurs frequently by determining whether the number of occurrences of a given pairing within a given document, divided by the number of occurrences of the adjacent word of the pairing within the document, is greater than a predetermined value.

56. A method of searching in accordance with claim 55 wherein the predetermined value is in the neighborhood of 0.0001.

57. An interactive document retrieval system in accordance with claim 30 which further includes:

arranging for communication with the requestor to occur using the internet protocol.

58. A method of searching in accordance with claim 52 which further includes maintaining the status of any given search procedure with the requestor.

59. An interactive document retrieval system designed to search for documents after receiving a search query from a requestor, said system comprising a knowledge database containing at least one data structure that relates words patterns to topics, wherein the knowledge database is initially constructed by analyzing indexed documents to which topics have previously been assigned, thereby determining the indexed document's word patterns, and then storing in the knowledge database these word patterns for the indexed documents and the topics assigned to these documents, and then relating the word pattern of an indexed document to the topics assigned to that same indexed document, and wherein the word patterns determined by analysis are pairings of words, each pairing comprising two searchable words with one word occurring frequently within the document and the other word occurring near the one word frequently within the document.

60. An interactive document retrieval system designed to search for documents after receiving a search query from a requestor, said system comprising:

a knowledge database containing at least one data structure that relates words patterns to topics and a query processor that categorizes the captured documents by comparing each document's word pattern to the word pattern in the database, and when a document's word patterns is similar to a word pattern in the database, assigns to that document the similar word pattern's related topic, wherein the word patterns determined by analysis are pairings of words, each pairing comprising two searchable words with one word occurring frequently within the document and the other word occurring near the one word frequently within the document.

61. A method of constructing a knowledge database for use in an interactive document retrieval system designed to search for documents after receiving a search query from a requestor, wherein said database contains at least one data structure that relates words patterns to topics, said method comprising the steps of:

analyzing indexed documents to which topics have previously been assigned, thereby determining the indexed document's word patterns, and then storing in the knowledge database these word patterns for the indexed documents and the topics assigned to these documents, and then relating the word pattern of an indexed document to the topics assigned to that same indexed document, wherein the word patterns determined by analysis are pairings of words, each pairing comprising two searchable words with one word occurring frequently within the document and the other word occurring near the one word frequently within the document.

62. A method of searching for and retrieving documents after receiving a search query from a requestor, said method comprising the steps of:

providing a knowledge database containing at least one data structure that relates word patterns to topics;

in response to the receipt of a search query from a requestor, searching for and attempting to capture documents containing at least one term related to the search query, if any documents are captured, analyzing the captured documents to determine their text patterns, categorizing the captured documents by comparing each document's word pattern to the word patters in the knowledge database, granting the requestor access to at least one subset of captured and categorized documents, wherein the word patterns determined by analysis are pairings of words, each pairing comprising two searchable words with one word occurring frequently within the document and the other word occurring near the one word frequently within the document.

63. An interactive document retrieval system designed to search for documents after receiving a search query from a requestor, said system comprising:

a knowledge database containing at least one data structure that relates word patterns to topics, the knowledge database containing a word combination table, a query word table, a document identification table, and a query linkage table and also a dictionary and synonyms;

a query processor that, in response to the receipt of a search query from a requestor, does the following searching for and trying to capture documents containing at least one term related to the search query, if any documents are captured, analyzing the captured documents to determine their word patterns, categorizing the captured documents by comparing each document's word pattern to the word patterns in the database, and when a document's word pattern is similar to a word pattern in the database, assigning to that document the similar word pattern's related topic, presenting at least one list of the topics assigned to the categorized documents to the requestor, and asking the requestor to designate at least one topic from the list as a topic that is relevant to the requestor's search; and granting the requestor access to the subset of captured and categorized documents to which topics designated by the requestor have been assigned.

64. An interactive method of searching for and retrieving documents after receiving a search query from a requestor, said method comprising the steps of:

providing a knowledge database containing at least one data structure that relates word patterns to topics;

in response to the receipt of a search query from a requestor searching for and attempting to capture documents containing at least one term related to the search query, if any documents are captured, analyzing the captured documents to determine their text patterns, categorizing the captured documents by comparing each document's word pattern to the word patterns in the knowledge database, and when a document's word pattern is similar to a word pattern in the database, assigning to that document the similar text pattern's related topic;

presenting at least one list of the topics assigned to the categorized documents to the requestor, and asking the requestor to designate at least one topic from the list as a topic that is relevant to the requestor's search;

granting the requestor access to the subset of captured and categorized documents to which topics designated by the requestor have been assigned; and building into the knowledge database a word combination table, a query word table, a document address table, and a query linkage table and also a dictionary and synonyms.

* * * * *